No. 702,825. Patented June 17, 1902.
N. E. SCHOONOVER.
MARKER FOR SEED PLANTERS.
(Application filed Apr. 17, 1902.)
(No Model.) 2 Sheets—Sheet 1.
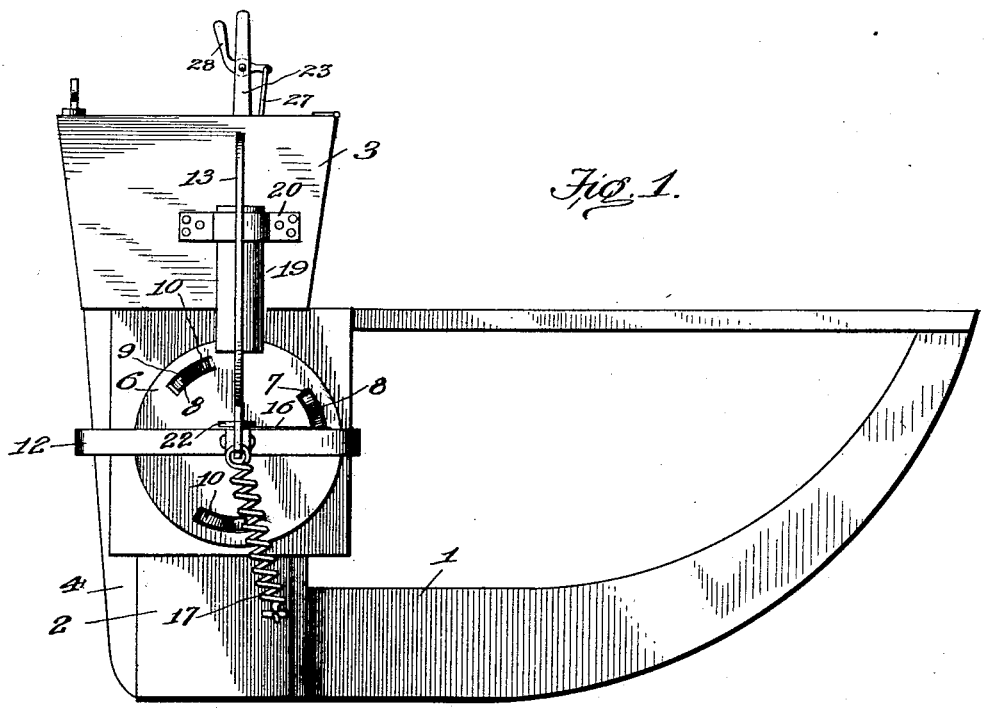
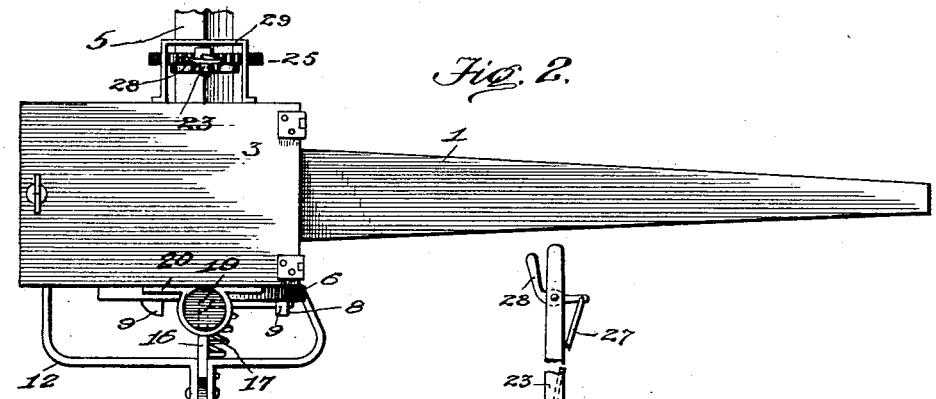
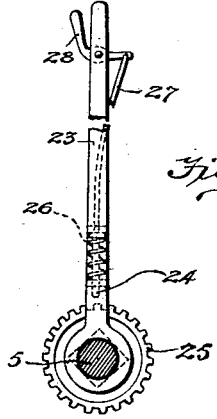
Witnesses
Inventor
N. E. Schoonover
By Attorneys No. 702,825. Patented June 17, 1902.
N. E. SCHOONOVER.
MARKER FOR SEED PLANTERS.
(Application filed Apr. 17, 1902.)
(No Model.) 2 Sheets—Sheet 2.
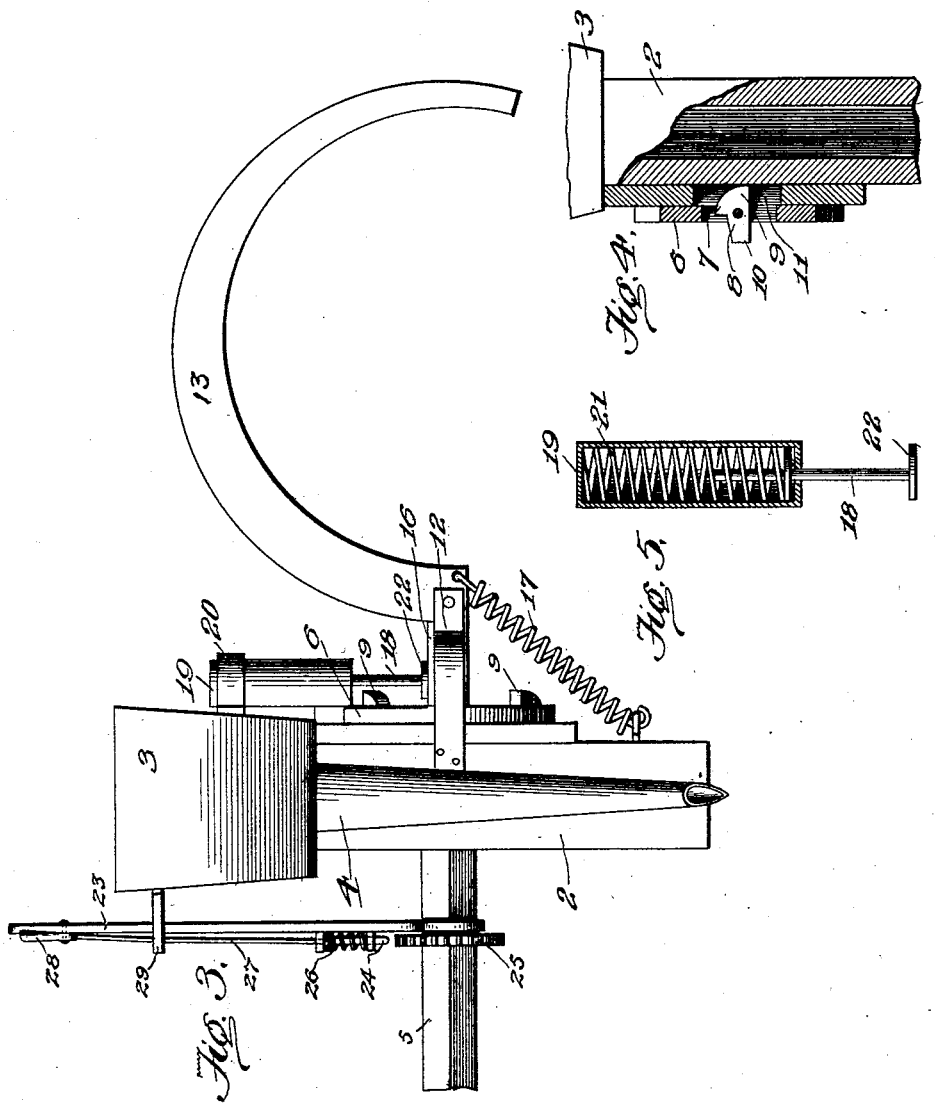
Inventor
N. E. Schoonover,
Witnesses
By H. B. Willson & Co
Attorneys

UNITED STATES PATENT OFFICE.

NOAH E. SCHOONOVER, OF BIGSPRINGS, SOUTH DAKOTA, ASSIGNOR TO JOSEPH C. BECK AND WILLIAM W. BURRILL, OF AKRON, IOWA.

MARKER FOR SEED-PLANTERS.

SPECIFICATION forming part of Letters Patent No. 702,825, dated June 17, 1902.

Application filed April 17, 1902. Serial No. 103,417. (No model.)

*To all whom it may concern:*

Be it known that I, NOAH E. SCHOONOVER, a citizen of the United States, residing at Bigsprings, in the county of Union and State of South Dakota, have invented certain new and useful Improvements in Markers for Seed-Planters; and I do declare the following to be a full, clear, and exact description of the invention, such as will enable others skilled in the art to which it appertains to make and use the same.

The invention relates to markers for seed-planters, and more particularly to those for planting corn.

The object of the invention is to provide a marker of this character which shall be simple of construction, durable in use, comparatively inexpensive of production, easily attached to the machines in general use, and adapted to perform its work in an efficient manner.

With this and other objects in view the invention consists of certain novel features of construction, combination, and arrangement of parts, which will be hereinafter more fully described, and particularly pointed out in the appended claims.

In the accompanying drawings, Figure 1 is a side view of the runner, seedbox, and seed-chute of a corn-planter. Fig. 2 is a top plan view. Fig. 3 is a rear view. Fig. 4 is a sectional view through the pawl-disk and a portion of the seed-chute and one of the pawls to illustrate the recesses into which the pawl is received when it rises opposite thereof to release itself from the marker and allow it to be thrust into the ground. Fig. 5 is a vertical sectional view of the spring-actuated plunger and its barrel, and Fig. 6 is a detail view showing the shifting lever in side elevation.

Referring to the drawings, 1 denotes the runner or furrow-opener, 2 a portion of the side of the front or runner frame, 3 the seed-box, and 4 the seed-chute, which may be of any well-known or approved form and in themselves constitute no part of the present invention.

5 denotes the drive-shaft, which regulates the discharge of seed through the bottom of the hopper and is provided at each end (but one in the present instance being illustrated) with a disk or head 6, having formed therein at equidistant points apertures 7, in which are pivoted dogs 8, which during the rotation of the wheel for a portion of its length have their toes 9 held outwardly by reason of their heels 10 engaging the side of the chute, and when each of these dogs reaches a recess 11, formed in the side of the chute, the heel enters said recess and the toe of the dog recedes, for a purpose hereinafter to appear, and in passing the recess the heel of the dog engages the wall of the recess and projects the toe of the dog into operative position.

12 denotes a frame secured to the grain-chute, and to this frame is pivoted a marker 13, preferably curved as shown and provided with an arm 16, projecting inward from the pivotal point of connection of the marker to the frame, which arm is adapted by suitable means to be projected into the path of movement of the dogs aforesaid.

17 denotes a coiled spring, one end of which is connected to the marker at a point outward of its pivotal connection to the frame and the other end of which is connected to some fixed part of the planter. The energy of this spring is exerted when the outer end of said marker is elevated by the depression of the inner end by the dogs, which cause the stretching of said spring, to draw the outer end of the marker downwardly into contact with the ground to mark the hill.

18 denotes a spring-actuated plunger mounted in the barrel 19, which is attached to the seedbox by a bracket 20. The spring 21 within the barrel is arranged to exert a downward pressure to project the head 22 of the plunger downwardly.

The operation of the machine is as follows: Assuming the shaft to be rotated and the parts to be in the position shown in Figs. 1 and 3 of the drawings, one of the dogs will come in contact with the arm of the marker and depress said arm, thus elevating the outer end of the marker against the action of the coiled spring 17. At the instant the dog in its rotation reaches the recess 11 the heel of the dog will be forced into said recess by the tension of the spring 17, and thus the toe of the dog will be withdrawn from engagement with the arm of the marker and the outer end of said marker be forcibly brought into contact with the ground by the spring 17. While the outer end of the marker is being drawn toward the ground by the spring 17 the inner end of the extension is moving upwardly against the plunger controlled by the spring 21 and this spring is being compressed, so that at the instant the outer end of the marker has been brought into contact with the ground and the spring 17 spent its energy the spring 21, having by its own compression been restored, exerts its energy to force the extension of the marker downwardly and the arm thereof into the path of movement of the next approaching dog. This downward movement of the arm raises the marker to the position shown in Fig. 1, in which position it is not under the tension of the spring 17. The energy of the spring 17 is not put under tension until the dog engages the arm of the marker and begins to depress it. Then the spring 17 begins to stretch, and at the instant the dog disengages the arm of the marker said spring forcibly plunges the outer end of the marker into contact with the ground. The marker descends at the instant the seed is dropped from the hopper.

It frequently happens when the machine is turned at the end of the field that the marker 13 does not register with the marks previously made, and hence the corn would not be dropped in regular rows. In order to permit the dropping mechanism to be easily regulated, I provide the shifting lever 23, which is loosely journaled on the drive-shaft 5. Slidably mounted on said lever is a pawl 24, adapted to be normally held out of engagement with the gear 25, fixed to the shaft 5, by the spring 26. A link 27 connects the pawl 24 to one end of the pivoted handpiece 28, so that when said handpiece is operated the pawl 24 will be forced down into engagement with the gear 25. By shifting the lever 23 when said pawl engages said gear the axle 5, and hence the marker-operating disk 6, can be turned to the proper position to operate the marker at the desired instant. A bracket 29, secured to one side of the seedbox 3, holds the lever in an upright position when not in use.

From the foregoing description, taken in connection with the accompanying drawings, the construction, mode of operation, and advantages of the invention will be readily understood without requiring an extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. In a marking device for seed-planters, the combination with a rotary frame, dogs carried by said frame, a pivoted marker, one end of which is arranged within the path of movement of said dogs, means for thrusting the outer end of the marker in contact with the ground, and a spring-actuated plunger for elevating said marker from contact with the ground and restoring it to its normal position within the path of movement of the dogs, substantially as set forth.

2. In a marking device for seed-planters, the combination with a rotary frame, of dogs pivoted to said frame to yield inwardly during a portion of their rotation with said frame and to be moved outwardly into their normal position, a pivoted marker, one end of which is arranged within the path of movement of said dogs, a spring for thrusting the outer end of the marker in contact with the ground, and a spring-actuated plunger for elevating said marker from contact with the ground and restoring it to its normal position within the path of movement of the dogs, substantially as set forth.

In testimony whereof I have hereunto set my hand in presence of two subscribing witnesses.

NOAH E. SCHOONOVER.

Witnesses:
E. W. EDGINGTON,
GEO. C. ENGLAND, Jr.